United States Patent [19]

Tulpule et al.

[11] Patent Number: 4,933,836
[45] Date of Patent: Jun. 12, 1990

[54] N-DIMENSIONAL MODULAR MULTIPROCESSOR LATTICE ARCHITECTURE

[75] Inventors: Bhalchandra R. Tulpule, Farmington; Robert E. Collins, East Hartford; Daniel G. Binnall, Simsbury, all of Conn.

[73] Assignee: United Technologies Corporation, Hartford, Conn.

[21] Appl. No.: 355,070

[22] Filed: May 17, 1989

Related U.S. Application Data

[63] Continuation of Ser. No. 924,646, Oct. 29, 1986, abandoned.

[51] Int. Cl.[5] ............................................. G06F 15/16
[52] U.S. Cl. ................................... 364/200; 364/229; 364/229.1; 364/228.7; 364/228.5; 364/232.7; 364/241.9; 364/244; 364/244.8
[58] Field of Search .............. 364/200 MS File, 200, 364/900 MS File, 900

[56] References Cited

U.S. PATENT DOCUMENTS

| 4,016,541 | 4/1977 | Delagi et al. | 364/200 |
| 4,028,675 | 6/1977 | Frankenberg | 364/900 |
| 4,365,294 | 12/1982 | Stokken | 364/200 |
| 4,514,807 | 4/1985 | Nogi | 364/200 |
| 4,641,238 | 2/1987 | Kneib | 364/200 |
| 4,672,535 | 6/1987 | Katzman et al. | 364/200 |
| 4,720,780 | 1/1988 | Dolecek | 364/200 |

OTHER PUBLICATIONS

"Concurrent Computers Ideal for Inherently Parallel Problems," Computer Design, Sep. 1, 1985, pp. 99–107 by Asbury et al.

Primary Examiner—Gareth D. Shaw
Assistant Examiner—Paul Kulik
Attorney, Agent, or Firm—Francis J. Maguire, Jr.

[57] ABSTRACT

A plurality of n-dimensional modular entities are internally interconnected via as many as n duel port random access memory devices (DPRs), each memory device dedicated solely to the interchange of information between two modular entities in an n-dimensional lattice of modular entities. One or more of the modular entities may itself be a separate multiprocessor architecture.

3 Claims, 8 Drawing Sheets

N-DIMENSIONAL MODULAR MULTIPROCESSOR LATTICE ARCHITECTURE

The government has rights in this invention in accordance with the terms of contract NAS2-11771.

This is a continuation of application serial number 924,646 filed Oct. 29, 1986.

Cross Reference To Related Applications

The invention described herein may employ some of the teachings disclosed and claimed in commonly owned co-pending applications filed on even date herewith by Tulpule et al., n-DIMENSIONAL MODULAR PROCESSOR, U.S. patent application Ser. No. 302,068, now Abandoned, n-DIMENSIONAL MODULAR INPUT-OUTPUT CONTROLLER, Ser. No. 266,294, now abandoned and EVENT DRIVEN EXECUTIVE FOR MULTIPROCESSOR SYSTEMS, Ser. No. 298,291, now abandoned which are hereby expressly incorporated by reference.

Technical Field

This invention relates to a new type of multiprocessor architecture and, more particularly, to an architecture which is well-suited to high throughput for irregular computations operating on nonhomogeneous data bases.

Background Art

The continuing advances in digital technology have led to the availability of increasingly powerful and complex microprocessors and other devices that can easily execute problems formerly considered too difficult and still have enough reserve capacity for growth. However, these very advances have also brought to the fore new, even more complex problems that were previously not contemplated or abandoned due to their extreme computational requirements. Thus new advances will, in turn, fuel the demand for even more powerful microprocessors and the continuing mismatch between demand for and supply of throughput capability appears to be a constant fact of life. Evidence of this imbalance may presently be found in many real time applications such as voice recognition, artifical intelligence and high reliability avionic systems. Indeed, in many of these applications, the computational requirements are so large that they may simply be beyond the capabilities of any single processor available today, or in the near term future.

A natural solution for the massive demand for computer power is the use of multiple processors to share the work load. There has been a large body of research effort aimed at designing multiprocessor based parallel computing systems with different architectural concepts tailored to the needs of specific applications. For example, a "massively parallel processor" system (MPPS) has been designed by Goodyear for NASA, and involves a matrix of processors, memories and controllers for solving large, matrix type of data manipulation problems. Similarly, systolic architectures involve large arrays of interconnected processors which can be reconfigured, depending upon the data flow needs of the problem. A key feature of these multiprocessor systems is that they are well-suited only for the implementation of algorithms that exhibit regularity or fixed patterns, e.g., matrix operations. As such, they are extremely useful in applications such as image processing and synethetic aperture radars where the large throughput requirements mainly stem from the need to operate on large, homogeneous data bases in a regular and parallel manner.

There exists, however, a more general class of problems where the computational tasks are far from regular and the nonhomogeneous data bases used in that class of problems require real time, sequential computations which are characterized by data dependent decisions and non-regular data flow patterns. Therefore, there is a need for a versatile multiprocessor system architecture that can meet the changing, real time applications for such problems by efficiently performing large and ever-changing complex computations in a sequential manner. Thus, there is a need for the ability for such architectures to grow and adapt to changing system definitions.

The throughput requirements of these irregular, real time computational applications are very large and complex and can change drastically from application to application. The full range of arithmetic and data manipulation, as well as input-output signal handling capabilities required, can also change drastically, according to application. In many cases, the computational complexities are due to the presence of the intertwining, looping and mixing of data flow paths between functions. The data flow paths and task executions depend on the mode of operation and serial, data driven decisions. This irregularity and unpredictability of data and execution flow makes a pipelined architecture unsuitable for solving the throughput problem of such applications.

Array processors developed in the past, such as the Burroughs ILLIAC IV, or the MPPS have been designed to meet the requirements of regular, "parallelizable" computations and perform very poorly when faced with sequential algorithms and irregular or scalar data flows. Such array processors are homogeneous in nature and usually perform the same computations in lock-step on the data presented. The arrays are not suitable for easy tailoring for each application. This is because they can only be changed in multiples of some basic unit and, furthermore require reprogramming of their operating and other control systems for each change.

The alternate, systolic architecture approach consists of cells or processing elements (PEs) which can be tailored to specific applications by means of configuration controllers. However, systolic architectures involve pipelining of data and are not suitable for irregular data and execution flow operations. The PEs in systolic architectures are identical in that they contain the same programs and, more importantly, can perform only a limited set of computations.

The need for high throughput is synonomous with the need for performing a given task within a given time with a minimum "waiting" time. Thus, for example, in avionic real time control system applications the computational transport delay timing requirements are extremely stringent as they determine the performance and capabilities of the system in terms of bandwidth, as well as the failure management and reliability qualities of the overall system. The use of multiprocessors stretches the data and execution flow across processor boundaries and becomes an added factor contributing to the overall transport delay. The need for reducing this additional transport delay is thus closely associated with the need for efficient and high bandwidth communication of interprocessor data elements. A high communication bandwidth capable of rapidly transferring a large number of signals is particularly necessary because of the presence of irregular and unpredictable data and execution flows spread across the multiprocessors.

In the past, the solution of the problem of interprocessor communication has taken on many forms. A common approach has been to transfer the data over serial buses. While this approach reduces the hardware penalty, it significantly and irrevocably increases the transport delay and may not be suitable for many high performance, real time applications, particularly if the quantity of signals involved is very large. This approach also requires significant software overhead for bus management.

An alternate technique called "mailbox", uses dedicated input/output ports for transferring data words between processors. This well known approach also has significant software overhead penalties associated with managing the input/output ports and, more important, it has the potential for race conditions caused by unsynchronized deposit and withdrawal of mailbox data elements. A better, and more efficient approach is direct memory access (DMA) in which one processor accesses the memory of the other(s) for data transfer by use of a DMA arbitration element. However, the design of DMA arbitrators can be difficult, particularly if the arbitration has to be done between many and/or different types of processors.

In many problems requiring high throughput and real time computations, there is frequently a need, although not related, for high reliability. In critical digital avionic control computer systems, the need for reliability places severe constraints on the configuration of multiprocessor architectures. It is desirable to employ an architecture that can be tailor made to meet and grow with the changing computational requirements without compromising the corresponding reliability, power, weight, volume and other requirements for the control system. This combination of requirements, therefore, prevents the use of systolic arrays or pipelined processors, etc., since they cannot be easily be tailored for individual applications.

Furthermore, systolic or pipelined architectures, in many cases, are unsuitable from a reliability and power standpoint.

Another difficulty with the use of systolic and other architectures is the need for reconfiguration of the data and execution flow paths driven by a controller. The presence of a single controller function and the need for reconfiguration of data paths typically employed in these systems makes them unappealing for high reliability avionic control systems.

Disclosure Of The Invention

An object of the present invention is to provide a scheme for large multiprocessor system architectures that facilitates the performance of irregular and complex computations operating on a nonhomogeneous data base in a sequential manner.

Another object of the present invention is to provide a high throughput capacity that can easily be tailored to suit changing requirements by altering the multiprocessor system architecture without adversely affecting throughput.

Still another object of the present invention is to provide a large bandwidth interprocessor communication capability within such a multiprocessor system architecture.

Still another object of the present invention is to provide for performing given tasks within a given time and with a minimum waiting time in each processor in such a multiprocessor system architecture.

Still another object of the present invention is to provide a dynamically non-reconfigurable and highly reliable architecture for such a multiprocessor system.

According to a first aspect of the present invention, a method of interconnecting a multiprocessor system is provided comprising the step of interconnecting a plurality of modular entities, including a plurality of signal processor entities, each entity having the capacity to be connected, via its address and data signal lines, to one or more dual port random access memories (DPRs), each associated DPR for dedication solely to the interchange of information between its associated modular entity and another modular entity in a lattice architecture of such modular entities.

In further accord with this first aspect of the present invention, a multiprocessor system architecture is constructed by interconnecting a plurality of modular entities, including a plurality of processor entities and a plurality input/output controllers, each having one or more internal dual port random access memories (DPRs) connected to its address and data signal lines, each associated dual port RAM for dedication solely to the interchange of information between its associated modular entity and another modular entity in a lattice architecture of such modular entities. Each DPR may be a memory which can be accessed by both modular entities at the same time, such that there are no incorrect accesses to data and where any and all simultaneous accesses to the same datum are arbitrated between the two modular entities.

In still further accord with this first aspect of the present invention, one or more of the processor entities in the lattice architecture may itself comprise a multiprocessor lattice architecture.

In still further accord with the present invention, a pure two-dimensional lattice architecture comprises a plurality of modular entities each having any number of associated dual port RAMs, not greater than four, for interchanging information with any number of corresponding modular entities, not greater than four, in the lattice. Each of the plurality of modular entities also has the capacity to be interconnected via said address and data signal lines with any number of additional modular entities, not greater than four, in the lattice. Each additional modular entity has any number of dual port RAMs, not greater than four, for dedicated communication over said address and data signal lines.

In further accord with the present invention, a pure three-dimensional lattice architecture comprises a plurality of modular entities in which each modular entity has any number of associated dual port RAMs, not greater than six, for interchange of information with any number of corresponding modular entities, not greater than six, in the lattice. Each of said plurality of corresponding modular entities also has the capacity to be interconnected via its address and data signal lines with any number of additional modular entities, not greater than six in the lattice. Said any number of additional modular entities will have a number of dual port RAMs for dedicated communication over said data and address signal lines.

It will of course be understood that the pure two-dimensional lattice architecture can very advantageously be constructed of just one type of modular processor entity having just two dual port RAMs (DPRs). The particular orientation of the DPRs within the modular processor entity need not concern us in any great detail here. Suffice it to said that for a regular lattice architecture in which the orientation of each processor entity is the same throughout, it will be desirable to have a DPR symmetry in which, for example, the DPRs are associated with the "Northern" and "Eastern" boundaries of a square modular processor entity. On the other hand, a square modular processor entity having two DPRs could have its DPRs located at the "Northern" and "Southern" boundaries, such as is disclosed in more detail below in an irregular lattice architecture (see FIG. 1). The ultimate choices up to the designer, of course.

It is also quite conceivable, for a two-dimensional lattice architecture for the modular processor elements to be non-identical throughout the lattice. Such a case, for example, might involve two distinct types of modular processor entities. One might have three DPRs and the other type might have only one DPR. Or, it is even conceivable to think of a lattice architecture in which many different modular processor entity configurations are utilized. However, the advantages of modularity rapidly decrease as the number of different types of modular units increases.

The same sort of comments apply to the pure three-dimensional lattice architecture described above. For example, a three-dimensional modular processor entity, pictured as a cube, might have three DPRs associated with three of its sides, all of which are touching one another. This would be a selected DPR configuration for a regular lattice architecture. Irregular lattice architectures would be made up of DPR configurations other than that described.

All of the above comments made regarding the two-dimensional and three-dimensional lattice architecture cases can equally be made for the n-dimensional case. Thus, although it will generally be true that for a regular n-dimensional lattice architecture it will be very advantageous to use N DPRs, strategically placed in n-dimensional space, this is not a necessity. Thus, the symmetry of placement of DPRs may also be of importance for the n-dimensional case but it may not be crucial.

Although the n-dimensional lattice architecture of the present invention has been described as comprising typically two-dimensional square modular entities or three-dimensional cubic modular entities, it will be realized that this convention has been adopted merely as an aid for teaching the invention. Thus, the scope of the invention includes other "shapes" of modular entities which use the same basic concept of having dedicated DPRs between pairs of modular entities. Thus, it will understood that such a lattice architecture may be conceived of in a wide variety of different ways; these might include other geometrical constructs having, for example, processor entities at the vertices of the geometrical shape constituting the modular entity, processor elements disbursed at various regular positions within the internal space of a modular unit, and a wide variety of other conceivable lattice structures having modular entities as building blocks and having dedicated DPRs between modular entities.

It will also be realized that a lattice architecture need not be purely of any one dimension. Thus, it will be possible to use a two-dimensional modular processor entity in combination with a three-dimensional modular processor entity. In fact, any number of different dimensional modular entities may be combined in an "impure" lattice architecture which would be hard to describe generically but which is nonetheless within the literal scope of the broadest claims herein.

The generic modular processor entities disclosed herein are significantly different from the PEs used in the systolic architectures, in that elements in the modular multiprocessor lattice architecture perform different tasks and handle unique data flows and are not limited in terms of the processors used or the types of instruction sets deployed. In the modular multiprocessor lattice architecture approach disclosed herein, the hardware data flow paths between processing entities are not permitted to be dynamically reconfigured, thereby eliminating the controller function and improving reliability and repeatability of operations.

The transport delay minimization scheme disclosed below is based on a Dual Port RAM memory (DPR) device which can be accessed by two, and only two processor entities simultaneously. This DPR function may be implemented by using some of the arbitration techniques disclosed in co-pending application U.S. Ser. No. (Attorney Docket No. H1811-GC) entitled ACCESS ARBITRATION FOR AN INPUT-OUTPUT CONTROLLER, or by using a self contained, internally arbitrated DPR RAM chip that has recently become available. In the DPR device, the arbitration is handled internally by the device on a word by word basis. Each modular processor entity can signal the other by means of an interrupt which can be used for interprocessor communications and elimination of race conditions. The use of a separate, pairwise dedicated DPR memory for each processor pair leads to minimum and predictable transport delays for computations spread across processors and is a key feature of the multiprocessor lattice architecture concept disclosed in this document.

The multiprocessor lattice architecture disclosed in this document provides the ability to tailor the system configuration, in terms of the processing elements and controllers, to the application thereby optimizing reliability, power and other cost factors while meeting very high throughput and real time requirements.

An important feature of the multiprocessor lattice architecture disclosed herein is that the interconnections between the processor elements and input/output controller elements are implemented as DPR's and are permanently defined for a given application. The use of a lattice architecture permits the tailoring of the architecture to a particular application and promotes high throughput, low transport delay and reliability. The processing elements and input/output controllers are designed as modular and generic elements that have ports for communication to adjacent or other elements. The number of ports selected for the modular designs can of course be changed to any number depending upon the needs of the application. Thus, the two-dimensional and three-dimensional modular elements disclosed herein are not to be taken as limiting, as modular elements for constructing n-dimensional architectures with 2n-port building blocks are possible. As mentioned above, other modular structures, albeit of less symmetry, are possible; it is also noted again that an n-dimensional entity or array can utilize and interface with a q-dimensional entity or array.

The operation of the multiprocessor lattice architecture involves the gathering of data by each input/output controller such as is disclosed in co-pending application Ser. No. (Attorney Docket No. H1701-GC), entitled GENERIC MULTIMODE INPUT OUTPUT CONTROLLER and the sharing of the workload by the processing entities by means, for example, of a task executive, such as is disclosed: in co-pending application, U.S. application Ser. No. 298,291, entitled AN EVENT DRIVEN EXECUTIVE FOR MULTIPROCESSOR SYSTEMS. Each processing entity consists of one or more signal processors or even separate multiprocessor lattice architectures, all with their own dedicated stored programs. The signal processors may or may not be identical, as the sharing of data is performed via dual port RAM memories and interprocessor interrupts. After the completion of each computational frame, the data is brought to the input/output controller elements for distribution to the outside world.

These and other objects, features and advantages of the present invention will become more apparent in light of the detailed description of a best mode embodiment thereof, as illustrated in the accompanying drawing. cl Brief Description Of The Drawing

Best Mode For Carrying Out The Invention

Figure 1:
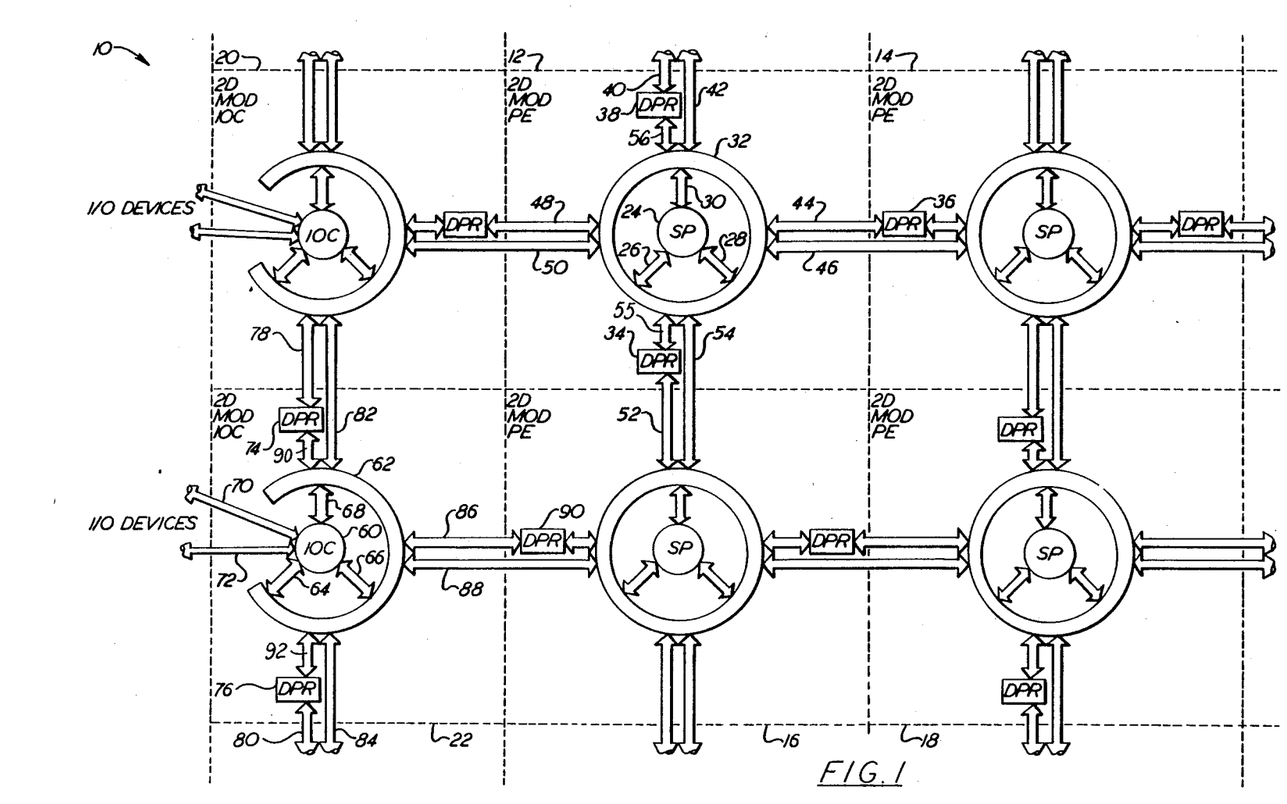
FIG. 1 is a pictorial representation of a two-dimensional multiprocessor lattice architecture, according to the present invention.

FIG. 1 is a pictorial representation of a two-dimensional multiprocessor lattice architecture 10, according to the present invention. A number of two-dimensional modular processing elements 12, 14, 16, 18 are illustrated connected to one another in a manner to be described in more detail below. The number of processing elements is at least two but may be any number.

A two-dimensional modular input/output controller (IOC) 20 may be used in the two-dimensional multiprocessor lattice architecture 10 shown in FIG. 1. Such an IOC serves the purpose of communicating data and control signals between the outside world and the multiprocessor architecture. Additional IOCs may be utilized as is indicated by an additional IOC 22, which helps to share the input/output work load. It is advantageous from the point of view of modularity to have both modular processing elements and modular IOCs for use as building blocks in the lattice architecture 10. However, it will be understood that the essence of the present invention goes to the use of a plurality of modular processing elements 12, 14, 16, 18 in a multiprocessor architecture which does not necessarily include modular IOCs. The IOC function may of course be effected by means of other than a separate modular unit. However, it will also be understood that it is advantageous to employ such a modular IOC.

Figure 2:
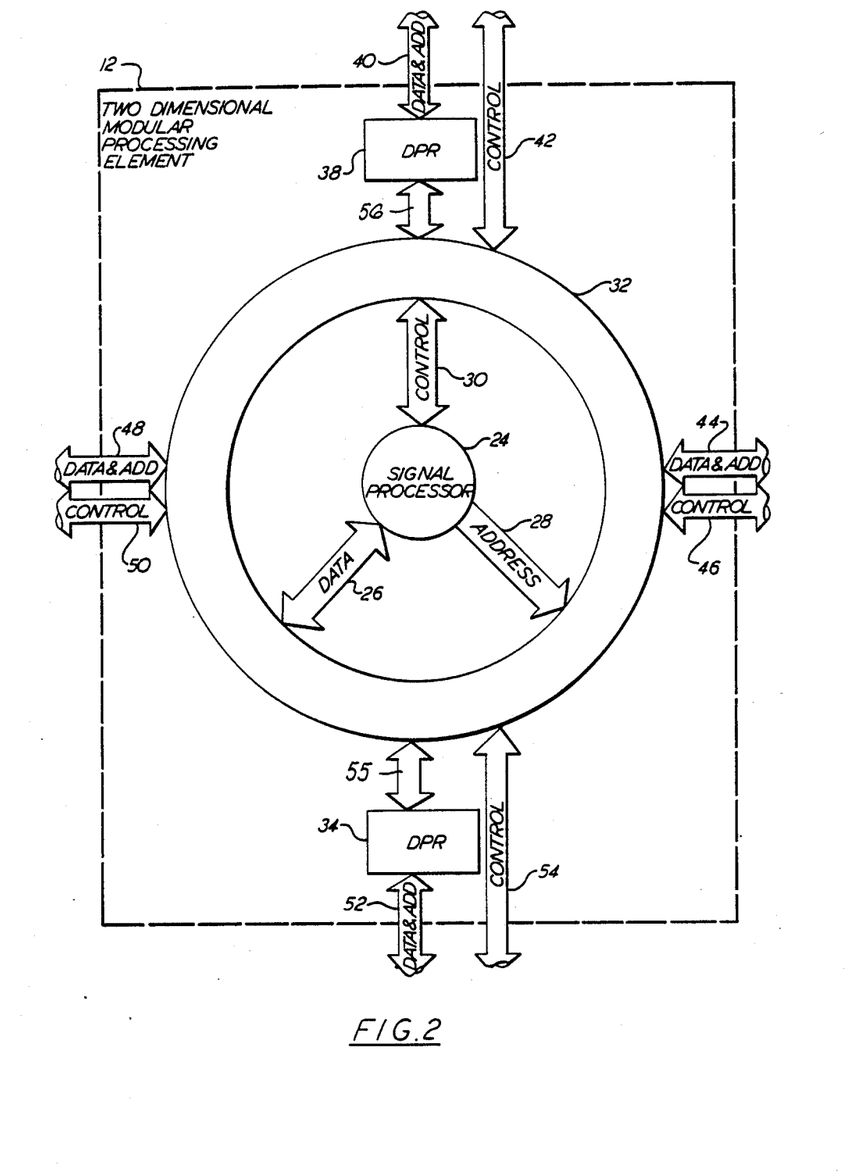
FIG. 2 is a pictorial representatioin of a two-dimensional modular processing element such as might be used in the two-dimensional lattice architecture of FIG. 1.

Referring now to FIG. 2, a pictorial representation of a two-dimensional modular processing element 12 is presented there. The processing element 12 of FIG. 2 corresponds to the similarly numbered processing element of FIG. 1 and is presented for the purpose of better illustrating the overall structure of that element.

A signal processing entity 24, which itself may consist of one or more signal processors, is the central element of the two-dimensional modular processing element 12. (The signal processing entity 24 may even comprise a multiprocessor lattice architecture such as illustrated in FIG. 1. In that case, the I/O lines, e.g., 70, 72 of modular IOC 22 of FIG. 1 would correspond to a ring bus 32 of FIG. 2). Data lines 26, address lines 28, and control lines 30 emanating from signal processor 24 are illustrated as connected to the circular ring bus 32 which is shown in this manner to better illustrate the manner in which the two-dimensional modular processing element interfaces with other entities in the lattice architecture.

In a two-dimensional architecture each two-dimensional modular processing element 12 should optimally have four ports. These are shown in FIG. 2 as emanating from the ring bus 32 and exiting the modular processing element 12, each through one of the four sides of the dashed lines which indicate the boundaries of the modular processing element. Of course, it will be understood that an actual circuit implementation of the multiprocessor lattice architecture in any dimension will normally not have any strict relation to the pictorial or functional representations shown in any of the Figures presented here as the circuits will normally be considerably more complex and mounted on printed circuit boards inserted into a chassis with other circuit boards. The interconnections will not be so simple or necessarily as symmetrical as illustrated here. These Figures are merely pictorial and functional representations which aid the presentation of the concepts involved.

The lattice architecture of the present invention relies on a dedicated memory storage area between each modular entity and every other modular entity with which it communicates in the lattice. This function can most effectively be implemented by a dual port random access memory (RAM). Of course, a dual port RAM is not absolutely essential, as mentioned above, since memory arbitration could be accomplished in lieu thereof.

For increased modularity of each of the two-dimensional modular processing elements 12, 14, 16, 18 it is best to provide two dual port RAMs per modular processing element. The other two ports in each element will not have a dual port RAM since they will be interfacing with other modular processing elements which do. The symmetry of processing elements constructed in this manner are highly advantageous as illustrated in FIG. 1. There, it will be observed that modular processing element 12 has a "South" port with a dual port RAM 34 which interfaces with a "North" port of modular processing element 16, which does not have a dual port RAM associated with it. Similarly, the "Eastern" port of modular processing element 12 does not have a dual port RAM associated with it but the "Western" port of modular processing element 14 does have a dual port RAM 36 associated with it. In this way, the symmetry of the modular processing elements enhances the facility with which a multiprocessor lattice may be constructed in which each modular processing element communicates with another modular entity, in general, through a dedicated dual port RAM.

It will be observed, in connection with the regularity symmetry in the lattice architecture of FIG. 1 that the individual modular processor entities change orientation in an irregular fashion in order to mate with adjacent entities. This is due to the symmetry used in the entity of FIG. 2. If the symmetry of the two DPRs of FIG. 2 were changed, e.g., so that the DPRs were located at the "Northern" and "Eastern" ports of the processing entity 12, then there would be more regularity in the lattice architecture of FIG. 1. Of course, it will be realized that there are a large number of variations in symmetry possible. It will also be realized that there may be more than one symmetry used in a given architecture.

Referring back to FIG. 2, it will be seen that the "Northern" port of modular processing element 12 contains a dual port RAM 38 having data and address lines 40 emanating therefrom for connection to another modular entity. Of course, it will be understood that the data and address lines 40 need not necessarily be connected to another modular entity since the "Northern" boundary of the particular entity utilized could coincide with a lattice architecture boundary, where no connection may be required. Control lines 42 also emanate from the ring bus 32 for communication across the "Northern" boundary of the modular processing element 12. Such lines are not absolutely necessary but would normally consist of hard wired interrupts, usually for use with signal processors having interrupt capability. Of course, these interrupts may also be provided over data and address lines 40. These comments with respect to interrupts apply as well to any port shown, with or without a dual port RAM.

The "Eastern" boundary of the modular processing element 12 is shown having data and address lines 44 and control lines 46 emanating from the ring bus 32.

Similarly, the "Western" boundary is illustrated having data and address lines 48 and control lines 50 emanating from the ring bus 32.

Figure 7:
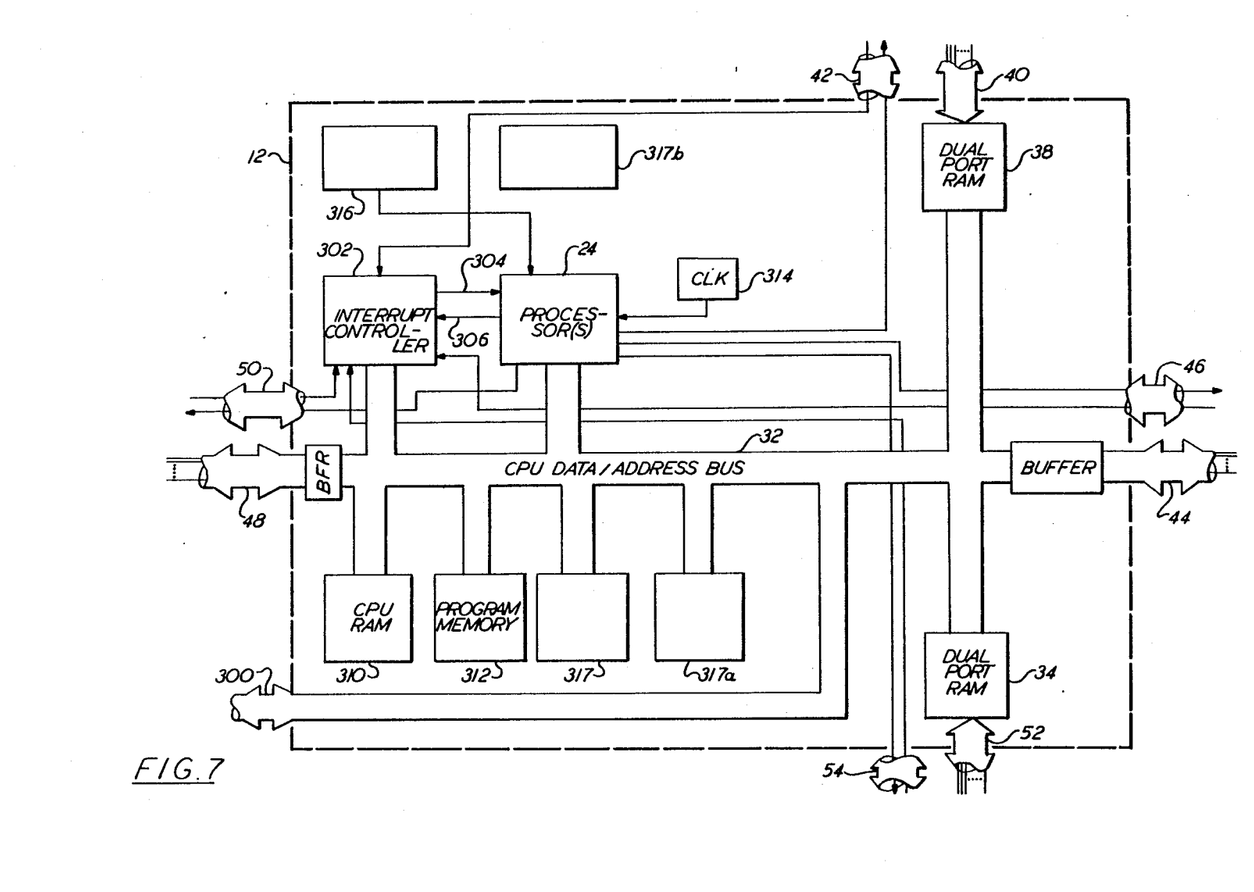
FIG. 7 is a simplified block diagram illustration of the internals of the two-dimensional modular processing element of FIG. 2.

The "Southern" boundary of the modular processing element 12 has a port which includes data and address lines 52 which interfaced with the ring bus 32 via the dual port RAM 34. Control lines 54 provide the hard wired interrupts to an adjacent modular processing element 16, as in FIG. 1. A more detailed, though simplified, block diagram illustration of the internals of a typical two-dimensional modular processing element such as the element 12 pictured in FIG. 2 is shown in FIG. 7, to be described in more detail subsequently.

Figure 3:
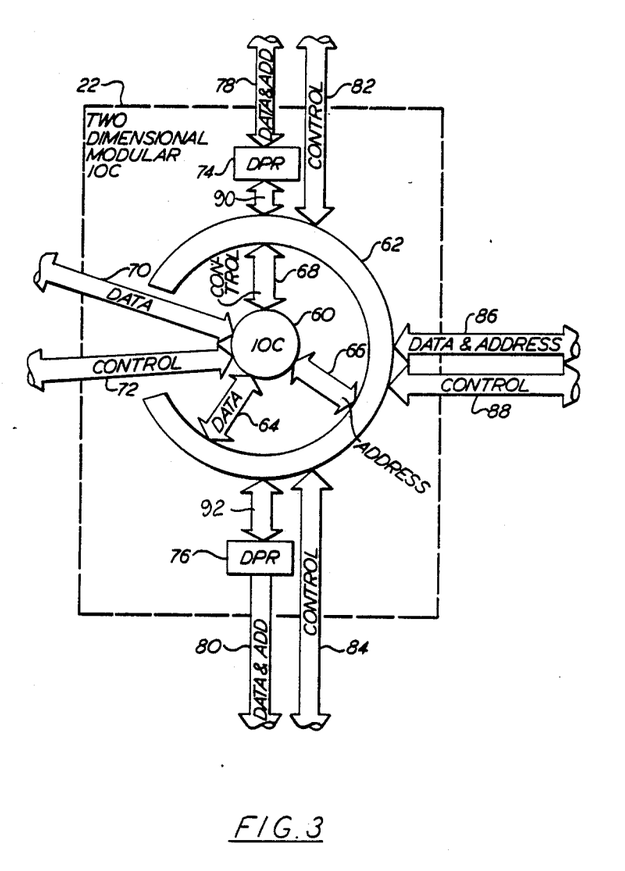
FIG. 3 is an illustration of a two-dimensional modular input/output controller (IOC) such as might be used in the two-dimensional lattice architecture of FIG. 1.

Referring now to FIG. 3, a pictorial representation of a two-dimensional modular IOC 22, is there illustrated in greater detail. The modular IOC is similar to the modular signal processor entity described previously except that its main function is to interface with input-/output (I/0) devices for the purpose of transferring data between the signal processors and the outside, i.e., non-signal-processing world.

Referring back to FIG. 1, it will be observed that the symmetry of the modular IOC 20, with respect to the number of dual port RAMs contained therein, is different from that of the modular IOC 22. Because the IOC finds its chief function in the inputting of external data to the signal processor entities and the outputting of information to the outside world, there is considerably more flexibility in the choice of its internal symmetry vis-a-vis the modular processing elements. This is due, of course, to the fact that the IOCs will appear only at the boundaries of the lattice architecture and, compared to the modular processing elements, serve a structural roll of not quite the same level of centrality. Thus, as explained previously, the essence of the present invention is directed more toward a lattice architecture having a plurality of modular processing elements, regardless of the input/output structure. Thus, it will be understood that the description contained herein with respect to modular IOCs is not limiting with respect to the basic lattice architecture comprising modular signal processing entities.

The modular IOC 20 of FIG. 3 comprises a central input/output controller (IOC) 60 surrounded by a ring bus 62 which communicates with data line 64, address line 66, and control lines 68 emanating from the IOC 60. It will be observed that the ring bus 62 of FIG. 3 is slightly different from the ring bus 32 of FIG. 2 in that it comprises a "broken circle" with a gap through which a pair of data line 70 and control lines 72 emanate at the "Western" port of the modular IOC 20 for communicating with I/0 devices in the outside world, as shown in FIG. 1.

At the "Northern" and "Southern" boundaries of the modular IOC 22 there exist ports having dedicated memories 74, 76, which may be dual port RAMs, and which may be used to communicate with other modular entities in the lattice architecture via data and address bus lines 78, 80 and control lines 82, 84. In FIG. 1, the "Northern" boundary communicates with IOC 20 while the modular entity, if any, communicating with its "Southern" boundary is not shown but which may be an empty slot, another modular IOC, or a modular processing element.

At the "Eastern" boundary of the modular IOC 22 of FIG. 3, there is illustrated a port having data and address lines 86 and control lines 88 for communicating with an adjacent modular entity. There is no dedicated memory associated with the "Eastern" port of this particular modular IOC since, as shown in FIG. 1, it is used in an application in which the adjacent modular processing element 16 already has a dedicated memory 90.

Thus it will be seen how the particular structure of the various IOC applications can vary widely even within the same lattice as shown by the different modular symmetries present in units 20 and 22. This is not to say, however, that one symmetry could not be used throughout. On the other hand, from optimum design and cost considerations, the modular processing elements will tend to have more uniformity and symmetry throughout a given lattice for increased efficiency.

Figure 4A:
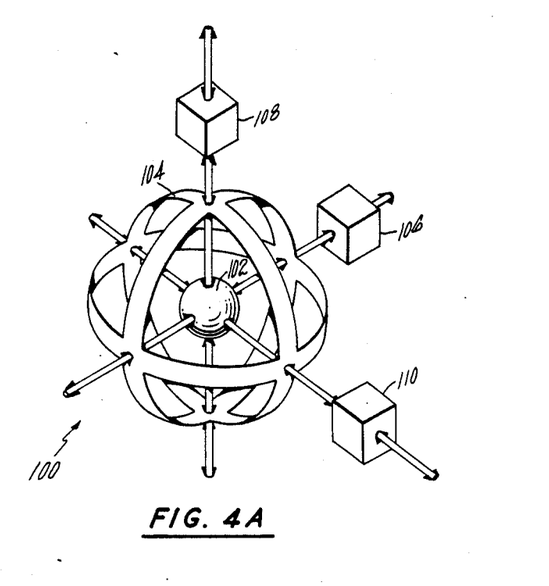
FIG. 4A is a pictorial representation of a three-dimensional modular processor entity according to the present invention.

FIG. 4a is a pictorial represenatation of a three-dimensional modular processor entity 100. A central signal processing entity 102 is surrounded by a three-dimensional version of the ring bus 32 of FIG. 2. Thus, a spherical "ribbon" bus 104 surrounds the signal processor 102 and provides data, address, and control signal paths for communicating with other modular entities in a three-dimensional multiprocessor lattice architecture via six different ports. The three-dimensional entity 100 pictured in FIG. 4a may be thought of as contained within an invisible (in the sense of not being pictured) cube having six separate faces. Each face has a port associated with it. Three of those ports, in the particular representation of FIG. 4a, have dual port RAMs 106, 108, 110 associated with them. The other three ports simply provide data, address, and control lines from their "faces" to be interfaced to other modular entities having DPRs. It will be understood that the illustration of FIG. 4a is somewhat complex and the separation maintained between data and address lines and control lines in FIG. 2 has been omitted for the purposes of simplicity. Of course, the modular three-dimensional processing element 100 need not have the exact same number of DPRs as shown but may instead have any number of DPRs. The number DPRs selected for illustration in FIG. 4a is merely illustrative, as is its symmetry. The particular symmetry shown, however, does promote regularity in a lattice constructed of such entities, unlike the particular symmetry pictured for the elements of FIGS. 1 and 2. As pointed out above, a practically realizable modular three-dimensional structure will likely have three DPRs because it will permit uniform expansion of the lattice in all three-dimensions. It should be noted that a three-dimensional lattice can interface with any other-dimensional lattice or entity through any one of its "faces" via a DPR.

Figure 4B:
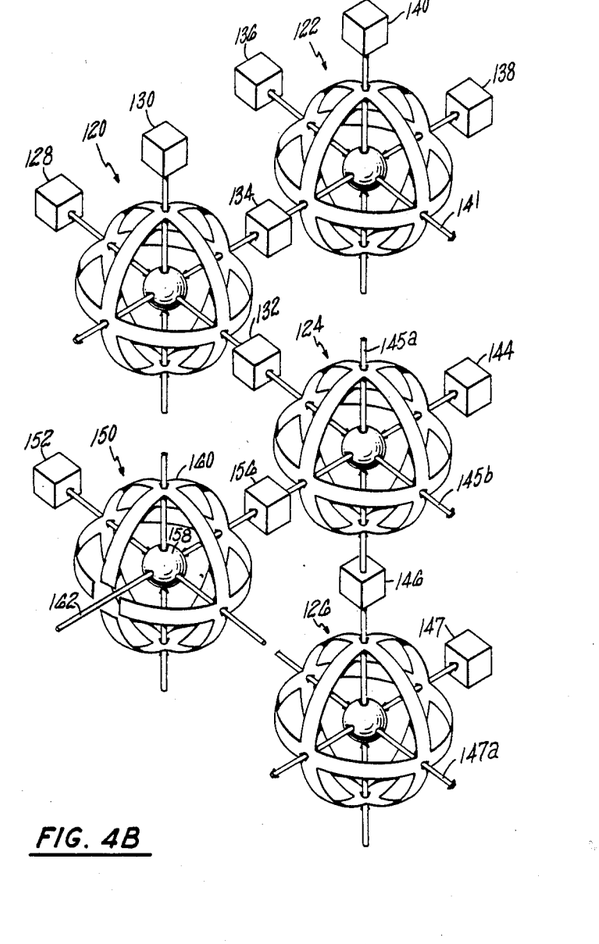
FIG. 4B illustrates a three-dimensional lattice architecture using several three-dimensional modular processors according to the present invention.

FIG. 4b illustrates a three-dimensional lattice architecture using several three-dimensional modular processing elements 120, 122, 124, 126 similar to those shown in FIG. 4a. If each of these elements has the same symmetry as that shown in FIG. 4a then, for example, modular entity 120 would have DPRs 130, 132, and 134 associated with it, within its boundaries (not shown). This means that a DPR 128 is provided within the boundaries of an adjacent three-dimensional modular processing element (not shown). This means that for entity 122, in a regular 3-D lattice, DPR 136 is provided from an adjacent modular entity (not shown). DPRs 138, 140, and an additinal DPR (not shown), associated with lines 141 are associated within the modular boundaries of entity 122. Entity 124 provides DPR 144 along with, for example, two DPRs (not shown) associated with lines 145a, 145b. This sort of a structure can be built to any size to fit any space almost indefinitely. For example, if modular entities 120, 122, 124 and 150 are all in the same plane, growth can be achieved downwards into a parallel plane below the above plane in which entity 126 can be pictured. In the regular architecture described above, this entity will also have the same DPR symmetry, having DPRs 146, 147 and an additional DPR (not shown) associated with lines 147a.

A three-dimensional modular input/output controller entity 150 is also shown in FIG. 4b having two DPRs associated with it, i.e., DPRs 152, 156. For the modular IOC, there is an internal IOC 158 surrounded by a "ribbon" bus 160 similar to the "ribbon" bus 104 provided for each of the three-dimensional modular processing elements 120, 122, 124, 126. The only exception is that one of the data and control busses 162 emanating from the IOC 158 does not intersect the "ribbon" 160. There is a small gap provided in the "ribbon" shown which is similar to the gap shown in the two-dimensional modular IOC 22 of the ring bus 62 of FIG. 3. Thus, data and control lines 162 are provided for interfacing with I/0 devices. These lines must be insulated from the CPU buses 160.

Figure 5:
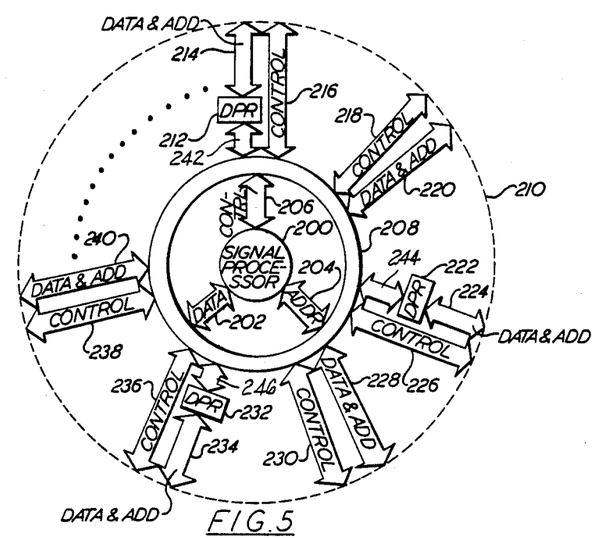
FIG. 5 is a pictorial representation of an n-Dimensional processing element, such as would be used in an n-Dimensional multiprocessor lattice architecture.

Referring now to FIG. 5, a pictorial representation is there shown of an n-dimensional modular processing element for use, for example, in an n-dimensional multiprocessor lattice architecture. It will of course be understood that a lattice architecture or modular entity of one particular dimension can interface with other-dimensional lattices and/or entities. A signal processing entity 200 which may itself be a multiprocessor lattice has data lines 202, address lines 204, and control lines 206 emanating therefrom for communicating with a data, address, and control ring bus 208. The ring bus has a number of output ports, typically 2n ports, for an n-dimensional modular processing element. In such a 2n ported or "faced" n-dimensional modular processing element there will also typically be a dual port RAM associated with exactly one half of the 2n ports. In other words, there will be n dual port RAMs. There will also be n ports without dual port RAMs. Of course, it will be understood that the symmetry described, i.e., ½n DPRs for n ports, is not a limitation on the scope of the claimed invention, as explained previously.

The pictorial representation of FIG. 5 shows a signal processor with a ring bus much like the hub of a wheel having a number of spokes emanating therefrom out to a rim 210 which, in effect, demarcates the boundary of the n-dimensional modular processing entity. The ends of the "spokes" of the "wheel" are associated with the 2n ports and contain the necessary data, address, and control signals for communicating with other modular entities in the n-dimensional lattice architecture.

Thus, a dual port RAM (DPR) 212 is shown interfacing with the ring bus 208 and providing a data and address bus 214 to the boundary 210 for communicating directly with another modular entity in the lattice, i.e., directly with the ring bus of another modular entity without having to go through another DPR. In other words, each of the spokes in the "wheel" of FIG. 5 which has an associated DPR is for hook-up to a "spoke" in another, similar modular. entity in the lattice architecture which does not have a DPR associated therewith. Control lines 216 are for direct hook-up to other, similar lines in the other entity's spoke. An adjacent port has a "spoke" with control lines 218 and data and address lines 220 for communicating between the ring bus 218 and the "rim", which may be considered the output port where it intersects with the "spoke".

Another pair of similar "spokes" is adjacent to the first pair, i.e., a first spoke having a DPR 222, a data and address bus 224, and a control bus 226, and a second spoke having a data and address bus 228 and a control bus 230.

A third such pair of spokes is shown in FIG. 5 having a first spoke with a DPR 232, a data and control bus 234, a control bus 236, and a second spoke having a control bus 238 and a data and address bus 240. Such pairs of spokes will be repeated again and again depending on the dimensionality of the modular processing element. For example, if a ten dimensional lattice architecture is used, there will be 10 such pairs of spokes.

Figure 6:
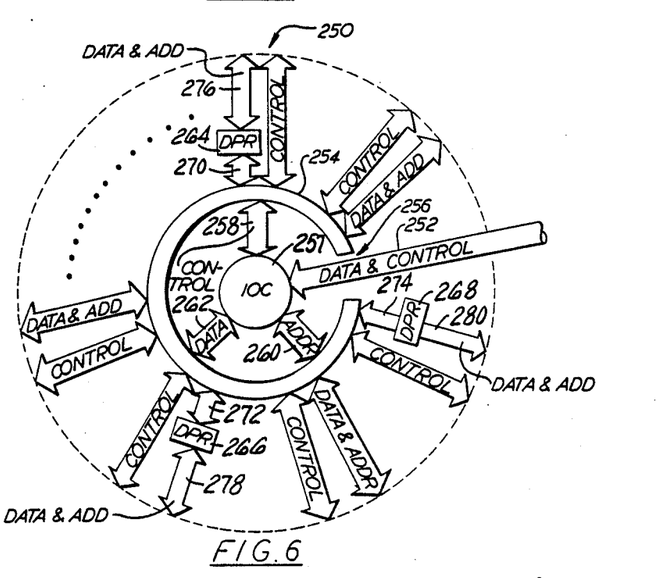
FIG. 6 is a pictorial representation of an n-Dimensional IOC such as would be used in an n-Dimensional multiprocessor lattice architecture.

Referring now to FIG. 6, a pictorial representation of an n-dimensional modular input/output controller 250 is there illustrated. It is very similar to the n-dimensional modular processing element shown in FIG. 5 except that the central element is an input/output controller (IOC) instead of a signal processor and there is an additional type of means of communication outside the modular entity 250, i.e., a data and control bus 252 is provided for communication directly between the IOC and the outside world. There is no direct connection between the data and control bus 252 and a data, address and control ring bus 254. Unlike the ring bus 208 of FIG. 5, the ring bus 254 of FIG. 6 has an opening 256 represented which indicates the separation of the Input-/Output data and control bus 252 from the digital data and control ring bus 254.

Other than this difference, the structure of the n-dimensional modular IOC is very similar to that of the n-dimensional modular processing unit of FIG. 5. It should be noted that the number of DPRs and spokes within the IOC can vary depending upon the application. Clearly, each spoke of the IOC can interface with a "face" of a modular processing entity of any dimension via a DPR.

Referring now to FIG. 7, a more detailed illustration of the two-dimensional modular processing element 12 of FIG. 2 is presented. The various North, East, South and West ports are shown, with the same orientation as in FIG. 2. In addition, another port 300 is shown with no buffering between it and a CPU Data/Address Bus 32, corresponding to the ring bus 32 of FIG. 2. Although not shown as a "ring" in FIG. 7, it will be understood that FIG. 2 was merely a pictorial representation provided as an aid to understanding the modularity of the processing entity in a multiprocessor lattice architecture. FIG. 7 is also a pictorial representation but is presented in a more conventional manner.

In addition to a processor 24 (which could be more than one processor, or even another lattice), there will also be, in a typical modular processing entity of any dimension, an interrupt controller 302 which is responsive to interrupts from other modular entities in the lattice architecture for communicating the presence of such interrupts to the processor by means of a signal line 304. The interrupt controller is also responsive to an interrupt signal on a line 306 from the processor 24 for initiating interrupts to the other modular entities in the lattice architecture via control lines 42, 46, 54 and 50. There will also be various other components within the two-dimensional modular processing element 12 including a CPU RAM 310, a PROM 312, a clock 314, and other functional blocks 316, 317, 317a, 317b, not specifically identified but which can assume various functions in typical processors.

The function of the CPU RAM 310 is to provide a memory area for temporary storage of data and instructions for the processor 24. The PROM is a programmable memory which is non-volitile, i.e., permanent memory which may be stored without the necessity of refreshing under power.

The clock 314 is for the purpose of providing a clock signal for the processor 24.

Figure 8:
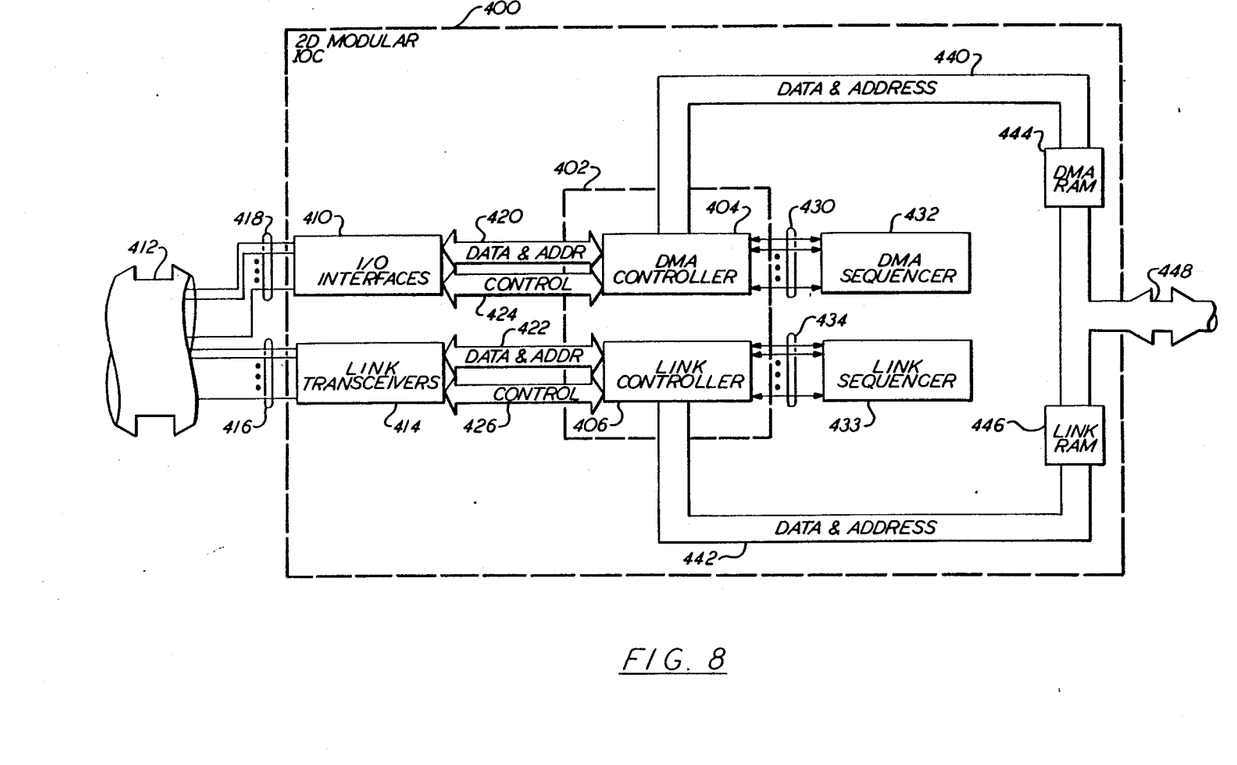
FIG. 8 is, a simplified block diagram illustration of the internals of a two-dimensional modular IOC similar to but not the same as the IOC of FIG. 3.

FIG. 8 is a pictorial representation of a two-dimensional modular IOC 400 similar to that pictured in FIG. 3 except that it is only able to interface with one modular entity in a two-dimensional lattice. Thus, it will be understood that the two-dimensional modular IOC shown in FIG. 3 is not the only structure which may be used but that many other variations are possible, including the variation shown in FIG. 8.

The heart cf the two-dimensional modular IOC 400 shown in FIG. 8 is a central controller 402 which includes a DMA controller 404 and a link controller 406. This is similar to the central IOC 60 of FIG. 3. It is split between DMA and link functions because of the particular structure of the multiprocessor architecture in which it happens to be utilized. I.e., in that architecture, there are a number of serial links between redundant channels which must be serviced separately from input-/output devices serviced by a DMA function.

In any event, input/output devices are interfaced with by means of a I/0 interface unit 410 over a plurality of lines 418 in an output trunk line 412. Similarly, a link transceiver unit 414 communicates over the same trunk line 412 via a plurality of lines 416.

Each of the units 410, 414 communicate with the IOC controller 402 via data and address lines 420, 422 and control lines 424, 426. The data and address lines in many embodiments might typically be 16 bit lines.

The sequencing of the DMA controller 404 is controlled via control lines 430 associated with a DMA sequencer 432. This may include a sequence of microcoded instructions. Similarly, a link sequencer 433 is provided which may also have a microcoded instruction set for controlling the link controller 406 via control lines 434.

Both the DMA controller 404 and the link controller 406 have separate data and address lines 440 and 442 for communicating, respectively, with a DMA RAM 444 and a link RAM 446. Each of these RAM units 444, 446 are tied to a CPU bus 448 for interfacing with one of the ring buses in the associated architecture within which it is utilized. Alternately, the DMA and Link Controllers 404, 406 may directly interface with one or more internal or external DPRs through one or more of the modular entity's faces, such as is pictured in FIG. 3.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A multiprocessor system having a plurality of n-dimensional processing element (FE) modular entities (12,210) interconnected in an n-dimensional lattice architecture, where n is a non-zero integer, in which a plurality of said PE modular entities each comprises:
   a signal processing core (24);
   a CPU RAM (310);
   a program Memory (312);
   an interrupt controller (302);
   at least one dual port random access memory (DPR: 34,38; 212,222,232); and least one
   a single CPU data/address bus (32) having at external port (44,48) and interconnecting said signal processing core, said CPU RAM, said program memory, said interrupt controller, said DPR and said external port with each other;
   and in which the single CPU data/address bus in a first one of said PE modular entities is connected by one of its ports to a DPR of a second one of said PE modular entities for pairwise interchange of data and address signals between said first and second PE modular entities, one DPR of said first PE modular entity is connected to a port of the single data/address bus of a third one of said PE modular entities for pairwise interchange of data and address signals between said first and third PE modular entities, and the single CPU data/address bus of said second PE modular entity is connected by one of its ports to a DPR of a fourth one of said PE modular entities for pairwise interchange of data and address signals between said second and fourth PE modular entities.

2. A multiprocessor system according to claim 1 wherein n is at least three.

3. A multiprocessor system according to claim 1 wherein:

said first PE modular entity has at least three of said ports and at least three of said DPRs and the single data/address bus of said first PE modular entity is connected through second and third ones of its ports to DPRs of fifth and sixth ones of said PE modular entities respectively, and wherein second and third DPRs of said first PE modular entity are respectively connected to ports of the single data-/address bus of seventh and eighth ones of said PE modular entities, for pairwise interchange of data and address signals between said first PE modular entity and said fifth, sixth, seventh and eighth PE modular entities, respectively.

* * * * *

UNITED STATES PATENT AND TRADEMARK OFFICE
CERTIFICATE OF CORRECTION

PATENT NO. : 4,933,836

DATED : June 12, 1990

INVENTOR(S) : Tulpule et al.

It is certified that error appears in the above-identified patent and that said Letters Patent is hereby corrected as shown below:

Col. 5, line 64, "disbursed" should be --dispersed--.

Col. 14, line 42, "F" should be --P--.

Col. 14, line 51, "least one" should be deleted.

Col. 14, line 52, after "at" insert --least one--.

Signed and Sealed this

Twenty-eighth Day of April, 1992

Attest:

HARRY F. MANBECK, JR.

Attesting Officer      Commissioner of Patents and Trademarks